United States Patent
Connelly et al.

[11] Patent Number: 5,091,159
[45] Date of Patent: Feb. 25, 1992

[54] USE OF DEXTRAN AS A FILTRATION AID FOR THICKENER OVERFLOW FILTRATION IN KELLY FILTERS IN THE BAYER PROCESS

[75] Inventors: Lawrence J. Connelly, Oak Lawn, Ill.; Steven J. Abbatello, San Antionio, Tex.; David C. Davis, Chesterfield, Mo.; David A. Undlin, Victoria, Tex.

[73] Assignee: Nalco Chemical Company, Naperville, Ill.

[21] Appl. No.: 714,941

[22] Filed: Jun. 10, 1991

[51] Int. Cl.$^5$ ............................................. C01F 7/00
[52] U.S. Cl. ............................. 423/122; 423/121; 423/111; 423/130; 210/725; 210/727; 210/728; 210/734
[58] Field of Search ............ 423/121, 130, 122, 111; 210/725, 727, 728, 734, 730, 733

[56] References Cited

U.S. PATENT DOCUMENTS 3,085,853  4/1983  Lesinski et al. .................... 423/131
4,789,485  12/1988  Field et al. ......................... 423/121
5,008,089  4/1991  Moody et al. ...................... 423/121

FOREIGN PATENT DOCUMENTS 825234  10/1969  Canada .
2000515  4/1990  Canada .
1154993  6/1969  United Kingdom .............. 423/121

*Primary Examiner*—Theodore Morris
*Assistant Examiner*—Edward Squillante
*Attorney, Agent, or Firm*—John G. Premo; Robert A. Miller

[57] ABSTRACT

In the Bayer process for producing alumina from bauxite of the type wherein the bauxite is added to a caustic solution to produce a soluble aluminate solution and an insoluble red mud fraction which is then subjected to one or more separation steps to produce a thickener overflow which is then subjected to a Kelly Filter Press to polish the thickener overflow the improvement which comprises treating the thickener overflow and the filter aid with a filtration improving amount of dextran.

2 Claims, No Drawings

USE OF DEXTRAN AS A FILTRATION AID FOR THICKENER OVERFLOW FILTRATION IN KELLY FILTERS IN THE BAYER PROCESS

INTRODUCTION

The Bayer process recovers alumina from bauxite by the reaction of $Al_2O_3$ with caustic (NaOH) liquor, separation of the insoluble material, and precipitation of the alumina from the clarified solution If desired, water of hydration is removed by calcining.

Treatment of bauxite ore is usually confined to crushing, washing, and drying operations. Most of the bauxites that are mined do not require the more costly beneficiation techniques used on some other metal ores. Impurities such as iron, silicon, and titanium containing minerals are frequently so finely dispersed in the bauxite that they cannot be readily separated by physical methods. In some instances, however, bauxite ore may be upgraded by washing or wet screening to remove sand and some of the clay minerals.

At the beneficiation plant, the bauxite ore is slurried with liquor containing high levels of caustic (generally $\geq 200$ g/l- expressed as $Na_2CO_3$). The resulting slurry is pumped to pressurized digesters where high pressure steam is used to raise the temperature. Both alumina and silica are dissolved during this step and a complex sodium aluminum silicate (desilication product) is precipitated.

It is important to note that each Bayer plant is designed to process a specific type of bauxite ore. Because the solubility of alumina monohydrate and alumina trihydrate differ to a large extent in aqueous caustic solutions, different temperatures, and caustic levels are required when different types of bauxite are utilized As an example, trihydrate bauxite may be digested at temperatures of 140° C. at alkalinities of ~200 g/liter caustic With a monohydrate bauxite, which is not as readily soluble, temperatures as high as 250-300° C. and caustic levels of up to 300 g/liter are required.

The resulting slurry of sodium aluminate solution and insoluble red mud from the digesters is cooled through a series of flash tanks in order to reduce the pressure and bring the temperature of the liquor down to the atmospheric boiling point. A coarse sand fraction is removed by using either gravity separators or wet cyclones and the slurry normally reports to a thickener where a solid-liquid separation step takes place. The overflow from the thickeners still containing some solids is normally further clarified by addition of a lime-type filter aid followed by a filtration step. Kelly Filter Presses are often used for this filtration step.

The clarified liquor (filtrate) is cooled until it becomes supersaturated and seeded with crystals of alumina trihydrate. Alumina is precipitated as the trihydrate in tanks and the solids are classified by particle size. In the precipitation process, caustic soda is regenerated. The caustic soda and sodium aluminate remaining in the liquor is then recycled to digestion. The coarse fraction of alumina trihydrate (primary), generally product, is dewatered on rotary vacuum filters and washed to reduce the soda level. From here the alumina product is transferred into calciners where any free and combined water is removed, if the alumina is to be used in manufacture of aluminum metal. If the alumina is to be used in other applications, some of the free water will be removed but not necessarily the water of hydration. The finer alumina trihydrate generated in precipitation (secondary and tertiary seed) may or may not be washed prior to being used as seed in precipitation.

The settled phase from the initial clarification step in the thickeners is pumped into the washer train which is a counter-current decantation circuit. The purpose of the washer train is to recover soda and alumina values that are associated with the red mud solids and are reused in the process.

GENERAL STATEMENT OF THE INVENTION

Dextran when added to thickener overflow produced by the Bayer process prior to or after addition of filter aid greatly improves the filtration of the overflow when Kelly Filter Presses are employed.

THE INVENTION

In the Bayer process for producing alumina from bauxite of the type wherein the bauxite is added to a caustic solution to produce a slurry containing soluble sodium aluminate and an insoluble red mud fraction which is then subjected to one or more separation steps to produce a thickener overflow which is then subjected to a Kelly Filter Press to polish the thickener overflow, the improvement which comprises treating the thickener overflow and filter aid with a filtration improving amount of dextran.

THE DEXTRAN

The dextran should be water soluble and will generally have a molecular weight of at least 50,000 although values in the range 500,000 up to 10 million is preferred. The dextran preferably is a microbially produced polysaccharide and has a preponderance of glucose units joined together through 1:6 glucocide linkages. Suitable materials are described in U.S. 3,085,853. Dextran derivatives, such as the polyphosphates described in GB-A-1154993 or dextran sulphates mentioned in CA-A-825234, can also be used. The dextran can be supplied in the form of dry particulate solid, for instance which has been recovered from a microbial suspension. Often the final step of the purification may be a spray drying step in which other components may have been added to aid processing. In general such processing aids do not need to be removed from the dextran prior to its use as a flocculant. The dextran is usually dissolved in water or alkaline plant liquor before addition to the thickener overflow in the process of the invention.

DOSAGE

As will be shown hereafter the dextran may be used at a variety of dosages. Typically the range will be between 0.05-15 mg/1. At preferred embodiment good results are frequently achieved using from 0.05-5 mg/1. Typical and preferred dosages for the dextran are any amounts ranging from at least 0.1-2 mg/1 up to much higher amounts.

When practicing the invention as described above it is possible to increase the filtration rates in Kelly Pressure Filters leading to increased production. It further allows the use of less filter aid leading to longer cycle times in Kelly Pressure Filters. This therefore reduces operating costs by reducing filter aid costs and reducing manpower requirements. A final advantage of the invention is a substantial reduction in suspended solids, primarily iron and calcium containing minerals. This results in improved product quality which therefore means that a lower level of contaminants are present in the alumina produced by the Bayer process.

To illustrate the advantages in the invention the following are presented by way of examples.

EXAMPLES

EXAMPLE 1 —PLANT 1

Test Procedure

1. Measure out 500 ml settle overflow (ss ≈150 mg/l).
2. Heat to 98° C.
3. Add 5.0 ml filter aid (~12% calcium aluminate).
4. Add reagent and mix for two minutes.
5. Filter 100 ml of above suspension using a 47 mm filter funnel under 15″ Hg vacuum (using plant Kelly Pressure filter media).
6. Filter remaining suspension through the filter cake formed, recording the time to dryness of the filter cake and gravimetrically determine the suspended solids in the filtrate.

Set I

| Test No. | Program | Time (sec) | % Improvement in Filtration Time | Suspended Solids in Filtrate (mg/l) |
|---|---|---|---|---|
| 1 | Blank | 425 | — | 47.6 |
| 2 | 1.0 mg/l Dextran (MW ~5 × 10$^6$) | 281 | 33.9 | 41.2 |
| 3 | 2.5 mg/l Dextran | 196 | 53.9 | 39.2 |
| 4 | 5.0 mg/l Dextran | 323 | 24.0 | 68.4 |

Set II - Same test procedure as above, except 1.25 ml filter aid used.

| 5 | Blank | 392 | — | 26.4 |
|---|---|---|---|---|
| 6 | 1.0 mg/l Dextran | 252 | 35.7 | 8.8 |
| 7 | 2.5 mg/l Dextran | 370 | 5.6 | 12.0 |

EXAMPLE 2 —PLANT B

Test Procedure

1. Measure out 200 ml settler overflow (ss ~100 mg/l).
2. Heat to 99° C.
3. Add 500 mg/l filter aid.
4. Add reagent and mix for 10 minutes.
5. Filter total volume of suspension using plant Kelly Pressure filter media, recording the time to filter cake surface dryness.

Set I

| Test No. | Program | Time (sec) | % Improvement in Filtration Time |
|---|---|---|---|
| 1 | Blank | 243 | — |
| 2 | 0.5 mg/l Dextran (MW ~5 × 10$^6$) | 215 | 11.5 |
| 3 | 1.0 mg/l Dextran | 184 | 24.3 |
| 4 | 1.25 mg/l Dextran | 189 | 22.2 |

Set II - Same test procedure as above, except 750 mg/l filter aid used.

| Test No. | Program | Time (sec) | % Improvement in Filtration Time |
|---|---|---|---|
| 5 | Blank | 233 | — |
| 6 | 0.5 mg/l Dextran (MW ~5 × 10$^6$) | 142 | 39.1 |
| 7 | 1.0 mg/l Dextran | 150 | 35.6 |
| 8 | 1.25 mg/l Dextran | 183 | 21.5 |

EXAMPLE 3 —PLANT C

Test Procedure

1. Measure out 196 ml plant settler overflow (ss ~60 mg/l).
2. Heat to 90° C.
3. Add 4.0 ml filter aid (~10% lime slaked in strong Bayer liquor).
4. Add reagent and mix for 10 minutes at 90° C.
5. Filter total volume of suspension using plant Kelly Pressure filter media at 12″ Hg vacuum, recording the time to filter cake dryness.

Set I - Day 1

| Test No. | Program | Time (sec) | % Improvement in Filtration Time |
|---|---|---|---|
| 1 | Blank | 27 | — |
| 2 | 0.125 mg/l Dextran (MW ~5 × 10$^6$) | 24 | 11 |
| 3 | 0.25 mg/l Dextran | 22 | 19 |
| 4 | 0.5 mg/l Dextran | 23 | 15 |
| 5 | 1.0 mg/l Dextran | 32 | −19 |
| 6 | 2.0 mg/l Dextran | 72 | −167 |

Set II- Day 2

| Test No. | Program | Time (sec) | % Improvement in Filtration Time | Suspended Solids in Filtrate (mg/l) |
|---|---|---|---|---|
| 1 | Blank | 30 | — | N.D. |
| 2 | Blank | 29 | — | 40 |
| 3 | 0.25 mg/l Dextran (MW ~5 × 10$^6$) | 16 | 47 | 25 |
| 4 | 0.5 mg/l Dextran | 16 | 47 | 15 |
| 5 | 0.5 mg/l Dextran | 16 | 47 | N.D. |
| 6 | 2.0 mg/l Dextran | 17 | 43 | N.D. |

We claim:

1. In the Bayer process for producing alumina from bauxite of the type wherein the bauxite is added to a caustic solution to produce a slurry of sodium aluminate solution and an insoluble red mud fraction which is then subjected to a thickener and separation steps to produce a thickener overflow, wherein said thickener overflow results from solid liquid separation, whereby said thickener overflow is then subjected to a filter press which contains a filter aid to polish the thickener overflow the improvement which comprises adding to the thickener overflow and the filter aid as the only treating agent from 0.05 to 15 mg/l of dextran.

2. The process of claim 1 where the dextran has a molecular weight of at least 500,000.

* * * * *